No. 752,224. PATENTED FEB. 16, 1904.
H. HOLZWARTH.
TURBINE BEARING.
APPLICATION FILED OCT. 22, 1903.
NO MODEL.
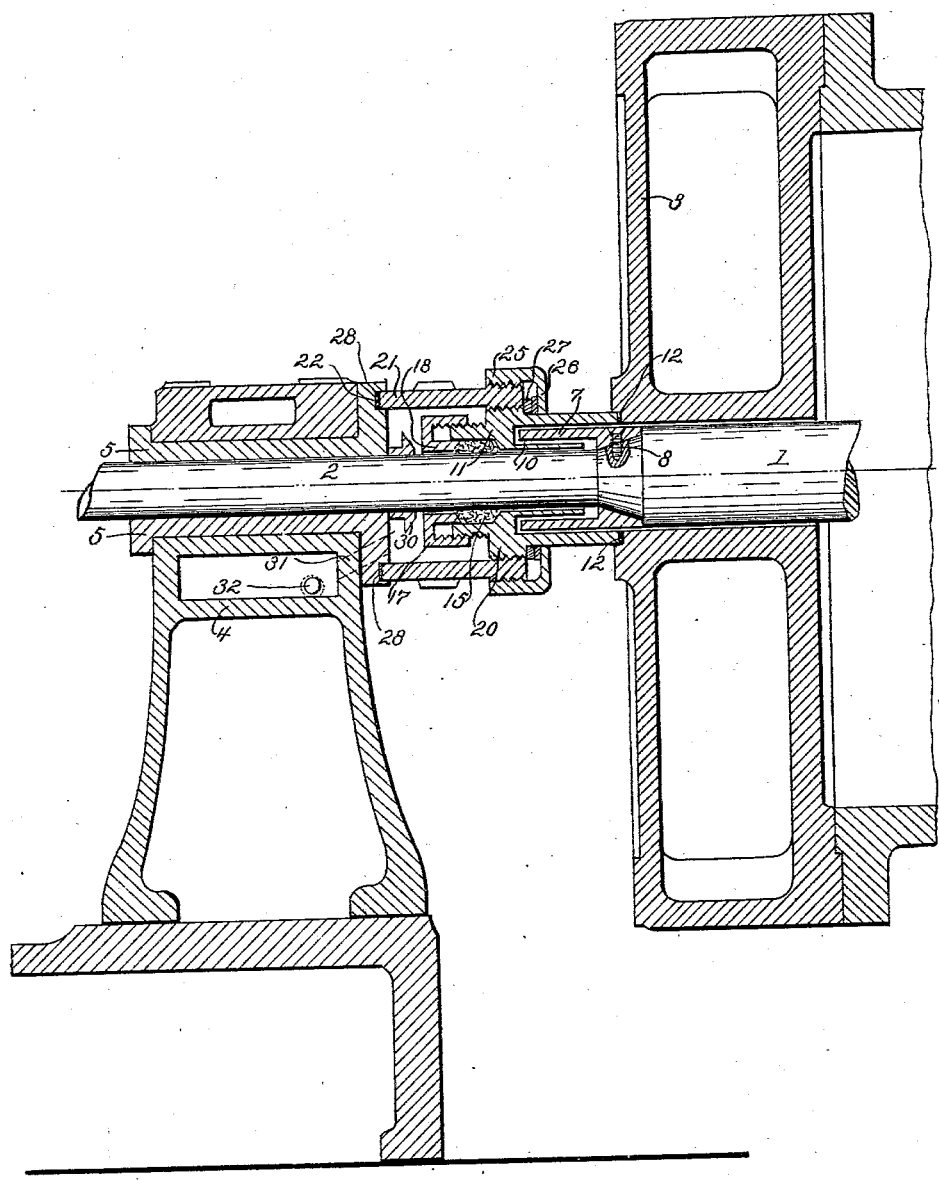
WITNESSES:
INVENTOR.
Hans Holzwarth
BY Erwin A. Wheeler
ATTORNEYS No. 752,224.

Patented February 16, 1904.

UNITED STATES PATENT OFFICE.

HANS HOLZWARTH, OF HAMILTON, OHIO, ASSIGNOR TO THE HOOVEN-OWENS-RENTSCHLER COMPANY, OF HAMILTON, OHIO, A CORPORATION OF OHIO.

TURBINE-BEARING.

SPECIFICATION forming part of Letters Patent No. 752,224, dated February 16, 1904.

Application filed October 22, 1903. Serial No. 178,064. (No model.)

*To all whom it may concern:*

Be it known that I, HANS HOLZWARTH, a citizen of Germany, residing at Hamilton, county of Butler, and State of Ohio, have invented new and useful Improvements in Turbine-Bearings, of which the following is a specification.

My invention relates to improvements in turbine-bearings.

The object of my invention is to provide a form of construction in which leakage of the motive fluid along the shaft will be effectually prevented and in which leakage of oil from the bearing into the turbine will be also prevented.

In the following description reference is had to the accompanying drawing, in which the figure is a vertical sectional view of my improved bearing, showing a portion of the turbine at the inlet end.

In the drawing, 1 is a turbine-shaft having its end 2 reduced. 3 is the head of the stationary member. 4 is a pillow-block, and 5 represents bushings of the bearing. These parts may be of any ordinary construction.

The sleeve 7 is rigidly secured to the shaft by screws 8 at the shoulder formed in the shaft by the reduced end portion 2, the opposing faces of the collar and shaft being preferably beveled in part, as shown in the drawing. The sleeve projects from the point of union with the shaft over the inner end of the reduced portion 2 into a recess 10, formed in a collar 11, which projects outwardly from the turbine-head 3. This collar preferably extends into an annular notch in the turbine-head, with packing 12 at the base of said notch to prevent leakage at this point. The tubular aperture in the collar 11, through which the portion 2 of the shaft passes, is enlarged at 15, the space between the collar and shaft at this point being filled with packing, as shown, and a nut 17, screwed upon the outer surface of the sleeve, is provided with a follower-flange 18, which extends within the sleeve and compresses the packing. The collar 11 is also provided with an outwardly-projecting rib 20. A ring 21, fitting a channel 22 in the bushing 5, is secured upon the rib 20, and a nut 25 is secured to the inner end of the ring 21, this nut being provided with an inwardly-projecting flange 26, fitting a collar 11 in the rear of the rib 20, with interposed packing 27 between the nut and rib. A gasket 28 is inserted in the channel 22 of the bushing 5, the ring 21 bearing against the gasket. 30 are dripflanges projecting inwardly from the bushing 5. 31 is a duct or passage leading to an aperture 32 in the pillow-block for the escape of oil from the bearing.

In the above-described construction it will be observed that the motive fluid following the shaft must pass outwardly over the sleeve 7 and then underneath said sleeve and the collar 11 before it reaches the packing 15. By the time it reaches the packing there will be sufficient water of condensation to effectually prevent material leakage. Any motive fluid, however, which passes the packing 15 is effectually pocketed in the space inclosed by the ring 21 and serves to expel oil dripping from the bearing through the duct 31 and aperture 32, thus preventing the oil from accumulating and following the shaft into the turbine when the latter is at rest. The ring 21 not only serves to pocket the motive fluid which leaks past the packing 15, but also serves to hold the collar 11 in position.

Having thus described my invention, what I claim as new, and desire to secure by Letters Patent, is—

1. In a turbine, the combination with a turbine-shaft, and stationary member; of a sleeve secured to the shaft and projecting outwardly from the stationary member; a collar projecting outwardly from the stationary member beyond the sleeve and provided with a flange projecting inwardly along the shaft within the sleeve; and suitable packing arranged to check the escape of motive fluid from between the collar and shaft, whereby condensation between the interacting members is permitted.

2. The combination with a turbine-shaft having a reduced end portion mounted in a suitable bearing; of a sleeve connected with said shaft and projecting over said reduced portion, with a space between it and said reduced portion; a collar covering the outer end of said sleeve and having a flange extending between the sleeve and the reduced portion of the shaft; a nut secured to the outer end of said collar; suitable packing interposed between the nut, collar and shaft; a ring secured to the outer surface of said collar and engaging the shaft-bearings; and a nut engaging the inner end of said ring, with packing interposed between the nut and collar, said ring being adapted to bind the collar forcibly against the turbine-head.

3. In a turbine, the combination with the shaft, and the head of the stationary member; of a set of interacting annular bearing members connected with the shaft and with the stationary portions of the turbine respectively and adapted to deflect and reverse the movement of the motive fluid passing outwardly along the shaft; packing interposed between the stationary bearing members and said shaft in the path of said motive fluid and the stationary bearing-block formed with a steam-tight joint between it and the stationary bearing members.

4. The combination with a turbine-shaft and the head of the stationary member; of a sleeve secured to the shaft adjacent to the head and projecting outwardly at a distance from the shaft; a stationary collar projecting outwardly from the head over said sleeve and having a flange projecting inwardly between the sleeve and shaft; a nut connected with said collar; packing interposed between the nut, collar and shaft, a bearing-block, and a ring projecting inwardly from the bearing-block and engaging said collar.

5. The combination with a turbine-shaft and the head of the stationary member; of a sleeve secured to the shaft adjacent to the head and projecting outwardly at a distance from the shaft; a stationary collar projecting outwardly from the head over said sleeve and having a flange projecting inwardly between the sleeve and shaft; a nut connected with said collar; packing interposed between the nut, collar and shaft; a bearing-block, and a ring projecting inwardly from the bearing-block and engaging said collar, said bearing-block being provided with drip-flanges inclosed by said ring and a duct for the escape of oil from the spaces adjacent to said drip-flanges.

6. In a turbine, the combination with a turbine-shaft, and stationary member; of a set of interacting bearing members connected with the shaft and stationary member respectively and arranged to reverse the flow of motive fluid escaping through the bearing; and packing located in the path of the escaping fluid beyond the interacting portions of said members, whereby the escaping motive fluid is permitted to condense between the interacting members before reaching the packing.

In testimony whereof I affix my signature in the presence of two witnesses.

HANS HOLZWARTH.

Witnesses:
   EDW. D. FRANK,
   EUGEN WEBER.